United States Patent
Snelgrove

(10) Patent No.: US 10,055,709 B2
(45) Date of Patent: Aug. 21, 2018

(54) RETAIL SHOPPING FACILITY-BASED USE OF TIME AND LOCATION CODES WITH PHYSICAL ITEMS

(71) Applicant: Wal-Mart Stores, Inc., Bentonville, AR (US)

(72) Inventor: Roger L. Snelgrove, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 3 days.

(21) Appl. No.: 15/423,718

(22) Filed: Feb. 3, 2017

(65) Prior Publication Data
US 2017/0220988 A1  Aug. 3, 2017

Related U.S. Application Data

(60) Provisional application No. 62/290,659, filed on Feb. 3, 2016.

(51) Int. Cl.
*G06Q 10/08* (2012.01)
*G06K 19/06* (2006.01)
(Continued)

(52) U.S. Cl.
CPC ....... *G06Q 10/087* (2013.01); *G06K 7/10861* (2013.01); *G06K 7/1417* (2013.01); *G06K 19/06037* (2013.01)

(58) Field of Classification Search
CPC .......... G06Q 10/087; G06K 19/06037; G06K 7/1417; G06K 7/10861
See application file for complete search history.

(56) References Cited

U.S. PATENT DOCUMENTS

| 770,792 A | 9/1904 | Beard |
| 6,318,631 B1 | 11/2001 | Halperin |

(Continued)

FOREIGN PATENT DOCUMENTS

GB    2455893    7/2009

OTHER PUBLICATIONS

PCT; App. No. PCT/US2017/137515; International Search Report and Written Opinion dated Apr. 13, 2017.

*Primary Examiner* — Kristy A Haupt
(74) *Attorney, Agent, or Firm* — Fitch, Even, Tabin & Flannery LLP

(57) ABSTRACT

A received item has a machine-readable timecode placed thereon. A storage area that contains this item is correlated with that timecode to provide correlated information. That correlated information is used to automatically determine when to move that item from that storage area to a display area. So configured, an item received at a product-receiving area of a retail shopping facility can have a label placed thereon, the label bearing a current time. After placing this labeled item in a non-public storage area of the retail shopping facility a handheld code scanner can help correlate a particular timecode/item with a particular machine-readable location code in the non-public storage area. That correlated information is used to automatically determine when to move that item from the non-public storage area to a retail display area of the retail shopping facility. So configured, earlier-received items can be reliably moved in this manner before later-received items.

5 Claims, 2 Drawing Sheets

(51) Int. Cl.
*G06K 7/14* (2006.01)
*G06K 7/10* (2006.01)

(56) References Cited

U.S. PATENT DOCUMENTS

| | | |
|---|---|---|
| 6,598,025 B1 | 7/2003 | Hamilton |
| 7,669,763 B2 | 3/2010 | Ernesti |
| 2006/0210115 A1 | 9/2006 | Nemet |
| 2009/0307265 A1 | 12/2009 | Nicholson |
| 2011/0035326 A1* | 2/2011 | Sholl ................. G06Q 30/018 |
| | | 705/317 |
| 2012/0101876 A1 | 4/2012 | Turvey |
| 2012/0136759 A1 | 5/2012 | Roslak |
| 2013/0173435 A1 | 7/2013 | Cozad |
| 2013/0214938 A1* | 8/2013 | Kim ................. G06Q 30/0283 |
| | | 340/870.07 |
| 2015/0166210 A1* | 6/2015 | Schram ................. G06Q 90/00 |
| | | 705/500 |
| 2015/0178671 A1* | 6/2015 | Jones ................. G06Q 10/087 |
| | | 705/28 |

* cited by examiner

RETAIL SHOPPING FACILITY-BASED USE OF TIME AND LOCATION CODES WITH PHYSICAL ITEMS

CROSS-REFERENCE TO RELATED APPLICATION

This application claims the benefit of U.S. Provisional Application No. 62/290,659, filed Feb. 3, 2016, which is incorporated herein by reference in its entirety.

TECHNICAL FIELD

These teachings relate generally to the application and use of time codes with physical items.

BACKGROUND

Retail shopping facilities have a retail display area where potential purchasers can view and select the items they wish to purchase. In many cases that retail display area harbors many of each item such that at least a portion of the facility's inventory is stored in that retail display area. Often, however, the retail shopping facility will have too many of at least some items to accommodate storing everything in that retail display area. Accordingly, many retail shopping facilities also have a non-public storage area to store items prior to moving those items to the retail display area.

Some items have a shorter shelf life than others. Perishable food items, for example, should ordinarily be sold or otherwise disposed of in a relatively short period of time. Other items may have a longer but nevertheless limited shelf life. Accordingly, proper management of a non-public storage area includes favoring moving older examples of a particular item to the retail sales area as versus moving newer examples of that item.

Unfortunately, while a simple enough preference to express, executing a useful, efficient, cost-effective process to reliably achieve such a result has proven elusive.

BRIEF DESCRIPTION OF THE DRAWINGS

The above needs are at least partially met through provision of the retail shopping facility-based use of time and location codes with physical items described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments a received item has a machine-readable timecode placed thereon. A particular location in a storage area that contains this item is correlated with that timecode to provide correlated information. That correlated information is used to automatically determine when to move that item from that storage area to a display area. So configured, for example, an item received at a product-receiving area of the retail shopping facility can have a label placed thereon, the label bearing a current time. After placing this labeled item in a non-public storage area of the retail shopping facility a handheld code scanner can help correlate a particular timecode/item with a particular machine-readable location code in the non-public storage area. That correlated information can then be used to automatically determine when to move that item from the non-public storage area to a retail display area of the retail shopping facility. So configured, earlier-received items can be reliably moved before later-received items.

These teachings are highly flexible in practice and will accommodate a variety of modifications and/or supplemental practices. By one approach, for example, the aforementioned timecode can comprise an optical code, such as a two-dimensional optical code.

Figure 1:
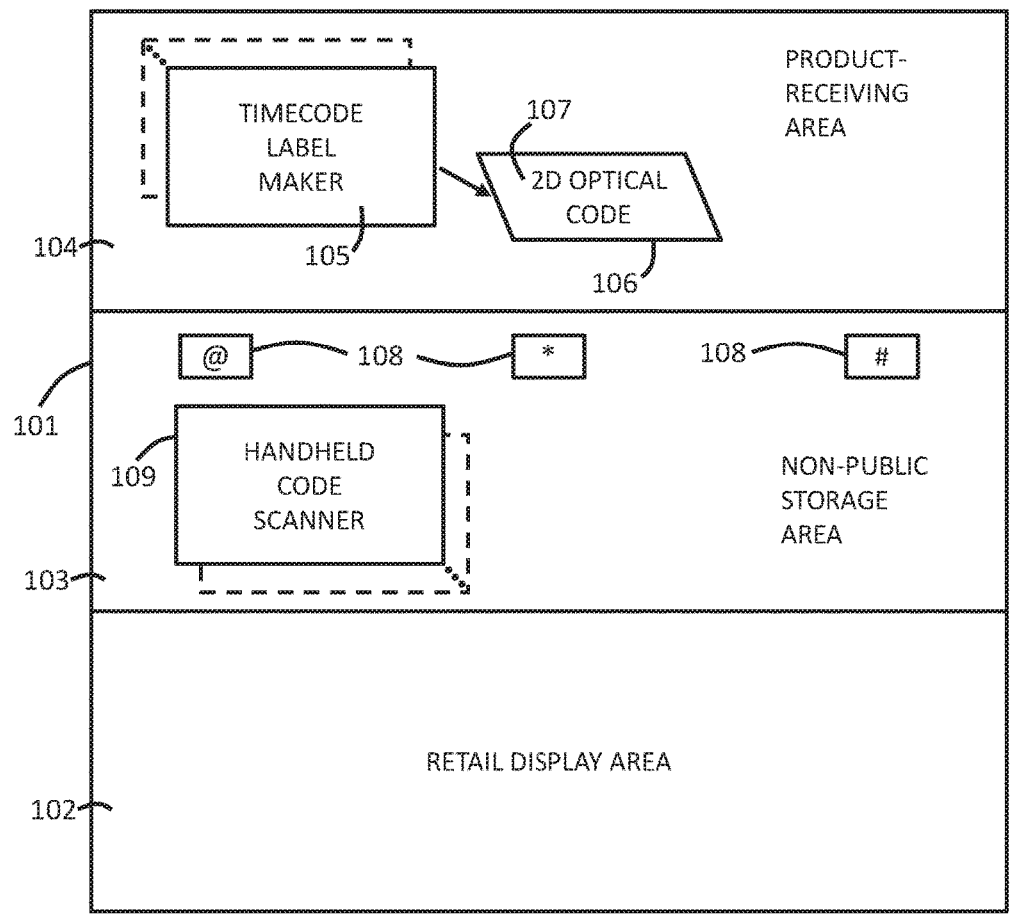
FIG. 1 comprises a block diagram as configured in accordance with various embodiments of these teachings.
Figure 1:
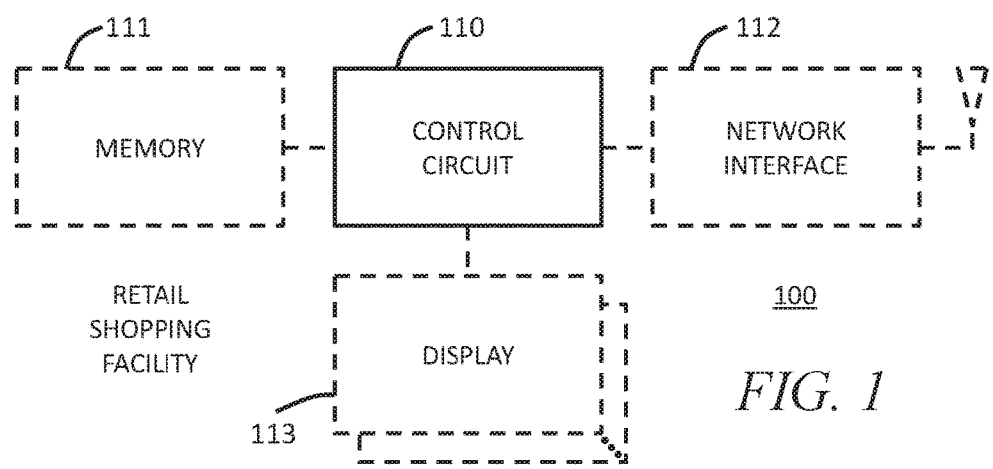

These and other benefits may become clearer upon making a thorough review and study of the following detailed description. Referring now to the drawings, FIG. 1 presents an application setting that is compatible with many of these teachings.

In this example the apparatus 100 that characterizes the application setting includes a retail shopping facility 101. This retail shopping facility 101 comprises a retail sales facility or any other type of bricks-and-mortar (i.e., physical) facility in which products are physically displayed and offered for sale to customers who physically visit the facility. The shopping facility may include one or more of a retail display area 102, checkout locations (i.e., point of sale (POS) locations), customer service areas other than checkout locations (such as service areas to handle returns), parking locations, entrance and exit areas, a non-public storage area 103 (having a plurality of physically-separated, independently-identified item-storage areas), a product-receiving area 104 (such as but not limited to a loading dock and corresponding staging area), hallway areas, common areas shared by merchants, and so on. The retail shopping facility 101 may be any size or physical format and may include products from one or more retail merchants. For example, a facility may be a single store operated by one merchant or may be a collection of stores covering multiple merchants such as a mall.

In this example the product-receiving area 104 includes at least one timecode label maker 105. This timecode label maker 105 produces labels 106 bearing an optical code 107 that comprises a current time (for example, a present time of day). By one approach this label 106 comprises a so-called sticker having a backside that presents an adhesive surface. So configured the adhesive side of the label 106 can be securely placed upon another surface such as a paperboard or plastic container or a product to be offered for sale at the retail shopping facility 101. By one approach the timecode label maker 105 is configured to automatically print, dispense, and place the resultant label 106 upon a corresponding surface of interest. By another approach the timecode label maker 105 prints and dispenses the label 106 and an associate places the label 106 on the surface of interest.

These teachings are highly flexible in practice in these regards. By one approach the timecode label maker 105 remains stationary during use (and may be attached, for example, to or above a conveyor belt or the like). By another approach the timecode label maker 105 comprises, at least in part, a handheld label-dispensing component. So configured, an associate wielding the handheld label-dispensing component can initiate the printing and dispensing of a label 106 that the associate then places on a surface of interest.

By one approach the optical code 107 that expresses the timecode is essentially only machine readable employing, for example, a one or two-dimensional optical code. Universal Product Code (UPC) barcodes that systematically represent data by varying the widths and spacings of parallel lines are examples of a one-dimensional optical code. Other codes that represent data using rectangles, dots, hexagons, and other geometric patterns in two dimensions are examples of a two-dimensional optical code. By another approach the optical code 107 includes, in part or in whole, time information that is also readily discernible and understood by human associates (employing, for example, alphanumeric characters and punctuation marks to express the time information).

Generally speaking, timecode label makers are known in the art as are labels that bear timecodes. As the present teachings are not overly sensitive to any particular selections in these regards, further elaboration regarding timecode label makers and the corresponding labels is not provided here except where particularly pertinent to the description.

In this illustrative example the non-public storage area 103 includes a plurality of machine-readable location codes 108. For the sake of simplicity and clarity, only three such machine-readable location codes 108 are shown in FIG. 1. It will be understood, however, that essentially any number of machine-readable location codes can be employed in a single non-public storage area 103. By one approach these machine-readable location codes also comprise an optical code such as one or two-dimensional optical codes as are known in the art.

These machine-readable location codes can comprise discrete labels or other signage or, if desired, can be directly applied to a surface of interest using, for example, spray painting or printing techniques or the like. These machine-readable location codes 108 can be located where desired. Accordingly, and by way of example, these machine-readable location codes 108 can be placed on the floor, on floor-mounted signposts or signs, on shelves, bins, barrels, or the like, and so forth.

Generally speaking, these machine-readable location codes 108 are relatively non-temporary and hence do not change their relative location on a regular basis as products enter and exit the non-public storage area 103. That said, these teachings will accommodate using machine-readable location codes 108 that can be moved from time to time to accommodate changing storage paradigms and requirements.

These machine-readable location codes 108 are each associated with a corresponding location in the non-public storage area 103 and that association can be stored, for example, in an available memory. By one non-limiting example each such code 108 corresponds to a specifically-defined area or volume. By another approach each such code 108 correlates strictly to a particular point or object within the non-public storage area 103.

In this illustrative example the retail shopping facility 101 also includes one or more handheld code scanners 109. In this example the handheld code scanner 109 is available in the non-public storage area 103. This handheld code scanner 109 is configured to scan and read the aforementioned timecode optical code 107 and the machine-readable location codes 108. When the timecode optical code 107 and the machine-readable location codes 108 use a same code format and standard the handheld code scanner 109 can employ a same scanning/reading technology to read both. When the timecode optical code 107 and the machine-readable location codes 108 use different code formats and/or standards the handheld code scanner 109 can be configured to employ two or more scanning/reading technologies that will, in the aggregate, compatibly scan/read both codes.

Code scanners, including handheld code scanners, of various kinds are known in the art. As the present teachings are not particularly sensitive to any particular choices in these regards (so long as the scanner is able to compatibly read the aforementioned timecode optical codes 107 and the machine-readable location codes 108), further elaboration in these regards is not provided here for the sake of brevity.

In this particular example, the enabling apparatus 100 also includes a control circuit 110. Being a "circuit," the control circuit 110 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 110 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 110 is configured (for example, by using corresponding programming as will be well understood by those skilled in the art) to carry out one or more of the steps, actions, and/or functions described herein.

By one optional approach the control circuit 110 operably couples to a memory 111. This memory 111 may be integral to the control circuit 110 or can be physically discrete (in whole or in part) from the control circuit 110 as desired. This memory 111 can also be local with respect to the control circuit 110 (where, for example, both share a common circuit board, chassis, power supply, and/or housing) or can be partially or wholly remote with respect to the control circuit 110 (where, for example, the memory 111 is physically located in another facility, metropolitan area, or even country as compared to the control circuit 110).

In addition to correlated information as described herein, this memory 111 can serve, for example, to non-transitorily store the computer instructions that, when executed by the control circuit 110, cause the control circuit 110 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 110 can also optionally operably couple to a network interface 112. So configured the control circuit 110 can communicate with other elements (both within the apparatus 100 and external thereto) such as the aforementioned handheld code scanner 109 via the network interface 112. Network interfaces, including both wireless and non-wireless platforms, are well understood in the art and require no particular elaboration here.

Also in this example the control circuit 110 can operably couple to one or more displays 113. Such a display 113 can be located for example, in the non-public storage area 103. In that case, the control circuit 110 can provide instructions to associates via the display 113 regarding which products from which areas within the non-public storage area 103 should now be moved into the retail display area 102.

Figure 2:
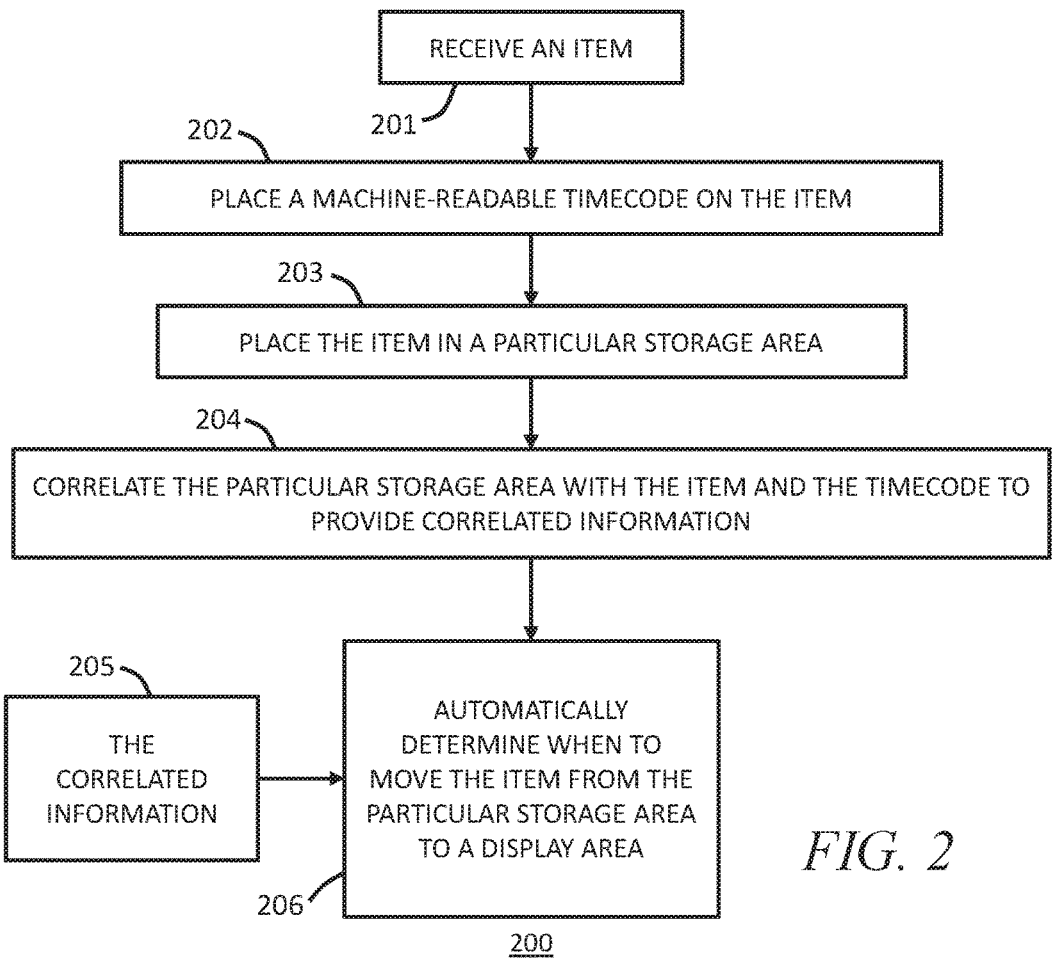
FIG. 2 comprises a flow diagram as configured in accordance with various embodiments of these teachings.

With continued reference to FIG. 1 and referring now to FIG. 2 as well, a corresponding process 200 will be presented.

At block 201 this process provides for receiving an item. This item can comprise, for example, a single item to be offered for retail sale such as a tube of toothpaste or a pair of jeans. These teachings will also accommodate an item that itself comprises a plurality of products that are intended for retail sale, such as a carton of twelve tubes of toothpaste. In a typical application setting, each individual item will include an external container such as a carton, bag, bottle, or the like, but this process 200 will readily accommodate items that lack an external container as well.

Figure 3:
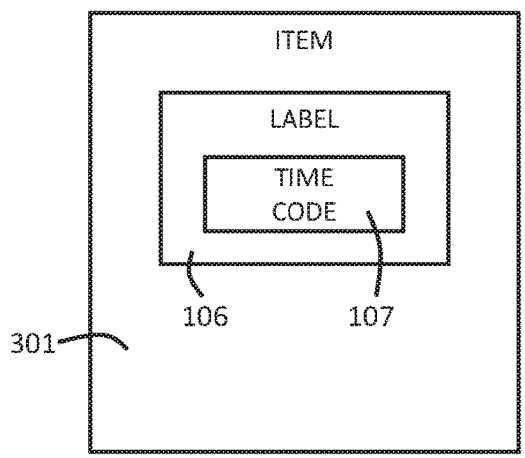
FIG. 3 comprises a schematic diagram as configured in accordance with various embodiments of these teachings.

At block 202, this process provides for placing a machine-readable timecode on the item. With reference to both FIGS. 1 and 3, this activity can include using the aforementioned timecode label maker 105 to print a label 106 having the desired machine-readable timecode presented thereon and then placing that label 106 on the item 301. If desired, this activity can comprising placing a plurality of such coded labels on a single such item (for example, one such label on each of a plurality of sides of the item 301). This approach can make it easier to later easily and quickly locate at least one of the labels 106 when viewing the item.

At block 203 this process provides for placing this item 301 in a particular storage area within the non-public storage area 103. Accordingly, it will be understood that the non-public storage area 103 is larger than the aforementioned particular storage area that now includes this item 301. These teachings will accommodate placing the item 301 in the non-public storage area 103 using essentially any conveyance mechanism or approach of convenience. Accordingly, the item may be carried, pushed, or pulled by an associate or carried, pushed, or pulled by a motorized device such as a motorized pallet mover or forklift.

The particular storage area that now corresponds to the stored item 301 includes a machine-readable location code 108 as described above. With this in mind, at block 204 this process 200 provides for correlating this particular storage area with the item 301 and with the item's timecode 107 to provide corresponding correlated information. By one approach an associate uses the aforementioned handheld code scanner 109 to read both the optical machine-readable location code 108 that corresponds to this particular storage area as well as the timecode 107. The aforementioned control circuit 110, by one approach, makes this correlation between the scanned codes and machine-readable location codes 108 and stores that correlated information 205 in the aforementioned memory 111.

By practicing these activities, the control circuit 110 will have correlated information 205 specifying where various items are stored within the non-public storage area 103 and when those items were received at the retail shopping facility 101. Accordingly, and as a simple example, the control circuit 110 can have information specifying that 20 cartons of eggs were received eight hours ago and are stored at a first location within the non-public storage area 103 and that 12 cartons of eggs were received previously 15 hours ago and are stored at a second, different location within the non-public storage area 103. It will be specifically appreciated that categorically similar or identical items (including perishable items such as dairy products, fresh produce, refrigerated meats, and so forth) can be stored at two or more physically separated areas within the non-public storage area 103. By one approach such categorically similar items are stored such that items having one corresponding time code are stored together at one physical location while other similar items having a different corresponding time code are stored together at a physically separated area. Accordingly, identical items having different time codes may be stored many feet apart from one another, such as ten feet, twenty-five feet, fifty feet, one hundred feet, and so forth as desired.

At block 206 the control circuit 110 uses this correlated information 205 to automatically determine when to move an item from a particular storage area in the non-public storage area 103 to a display area such as the aforementioned retail display area 102. By one approach the control circuit 110 may be triggered to make this determination in response to detecting that there is a need to restock the retail display area 102 with the item. This may occur, for example, upon detecting that a predetermined number of the item have been sold without any restocking having occurred. By another approach an inventory-monitoring system, such as a radio-frequency identification (RFID) tag-reading system, may provide the information that the control circuit 110 employs to detect the need to restock the item.

This automatic determination can be particularly useful when there are many identical items stored at different location within the non-public storage area 103. In such a case, the control circuit 110 can make this determination with a preference towards moving the oldest available items of the particular type from the storage area to the display area. To again refer to the simple example presented above, when it becomes necessary to replenish the supply of eggs in the retail display area 102 the control circuit 110 can first select the 12 cartons of eggs that are stored at the second location before selecting any of the 20 cartons of eggs that are stored at the first location and that were received more recently than the 12 cartons of eggs.

So configured, stock held in inventory can be efficiently, reliably, and easily selected for retail display via a process that greatly helps to ensure that older items are selected ahead of more recently received items to thereby help ensure freshness while avoiding waste.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus configured to automatically select stock held in inventory in a non-public storage area of a retail shopping facility to be moved to a retail display area by selecting older items ahead of more recently received items to thereby help ensure freshness while avoiding waste, the apparatus comprising:

a retail shopping facility having a non-public storage area having a plurality of physically-separated, independently-identified, item-storage areas, a retail display area, and a product-receiving area;

machine-readable location codes disposed at various locations within the non-public storage area to uniquely identify the physically-separated, independently-identified, item-storage areas;

a timecode label maker configured to produce labels bearing a current time to be placed upon items that are to be stored in the non-public storage area as inventory before being placed in the retail display area;

a handheld code scanner;

a control circuit configured and arranged to:

receive information from the handheld code scanner that correlates a particular machine-readable location code with a particular timecode with a particular item such that the information indicates where particular items are located in the non-public storage area and a corresponding time; and use the information to automatically determine when to move an item from the non-public storage area to the retail display area based at least in part upon the timecodes for the items.

2. The apparatus of claim 1 wherein the labels produced by the timecode label maker bear the current time as an optical code.

3. The apparatus of claim 2 wherein the optical code comprises a two-dimensional optical code.

4. The apparatus of claim 2 wherein the labels comprise stickers.

5. The apparatus of claim 1 wherein the machine-readable location codes comprise optical machine-readable location codes.

* * * * *